United States Patent [19]

Yoder

[11] Patent Number: 5,009,045

[45] Date of Patent: Apr. 23, 1991

[54] PLANK STRUCTURE FOR BOAT DOCK AND THE LIKE

[75] Inventor: Dennis G. Yoder, Nappanee, Ind.

[73] Assignee: CTB, Inc., Milford, Ind.

[21] Appl. No.: 417,827

[22] Filed: Oct. 6, 1989

[51] Int. Cl.⁵ .............................................. E04F 11/16
[52] U.S. Cl. ........................................ 52/177; 52/180; 52/181
[58] Field of Search .................. 52/177, 180, 181, 288

[56] References Cited

U.S. PATENT DOCUMENTS

| | | | |
|---|---|---|---|
| 1,441,327 | 7/1923 | Blum | 52/177 |
| 3,464,067 | 9/1969 | Hauck | 52/177 |
| 3,959,830 | 6/1976 | van den Breck | 52/288 |
| 4,078,515 | 3/1978 | Svirklys | 114/266 |
| 4,087,948 | 5/1978 | Mellor | 52/181 X |
| 4,266,381 | 5/1981 | Deller | 52/177 |
| 4,840,824 | 6/1989 | Davis | 52/181 X |

Primary Examiner—David A. Scherbel
Assistant Examiner—Linda J. Watson
Attorney, Agent, or Firm—Richard Bushnell

[57] ABSTRACT

A plastic plank member, for use with a deck arrangement, having a rigid base portion and a tread portion attached thereto which are integrally extruded of suitable plastics. The rigid portion of the plank member is adapted to be secured to an underlying support structure. The tread portion is formed with protrusions projecting upwardly away from the tread and grooves formed therein. The characteristics of the tread result in a sufficiently high coefficient of friction to reduce the possibility of slipping on the plank member.

13 Claims, 2 Drawing Sheets

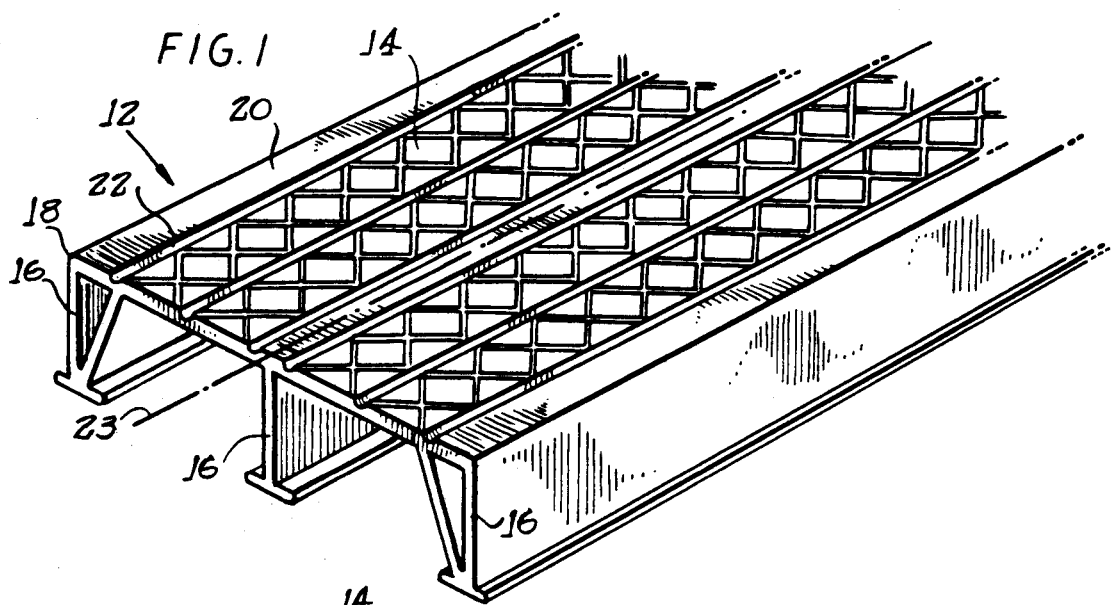
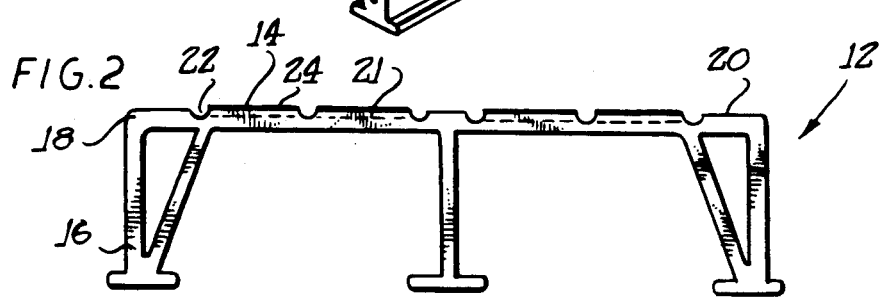
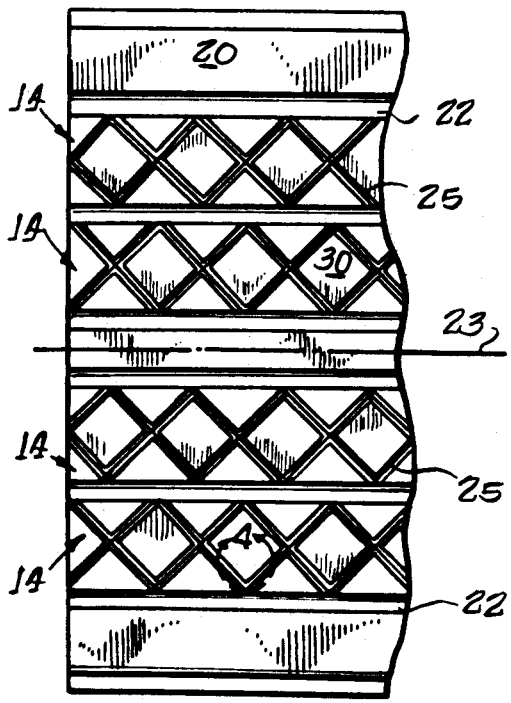
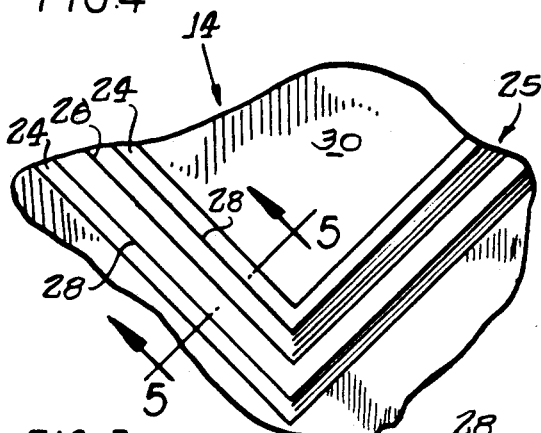
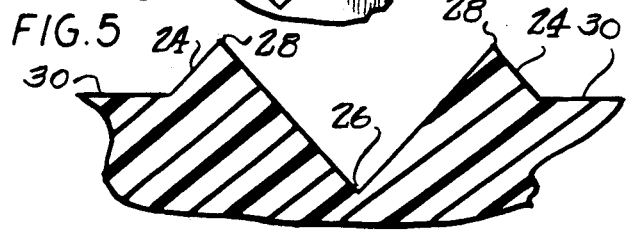

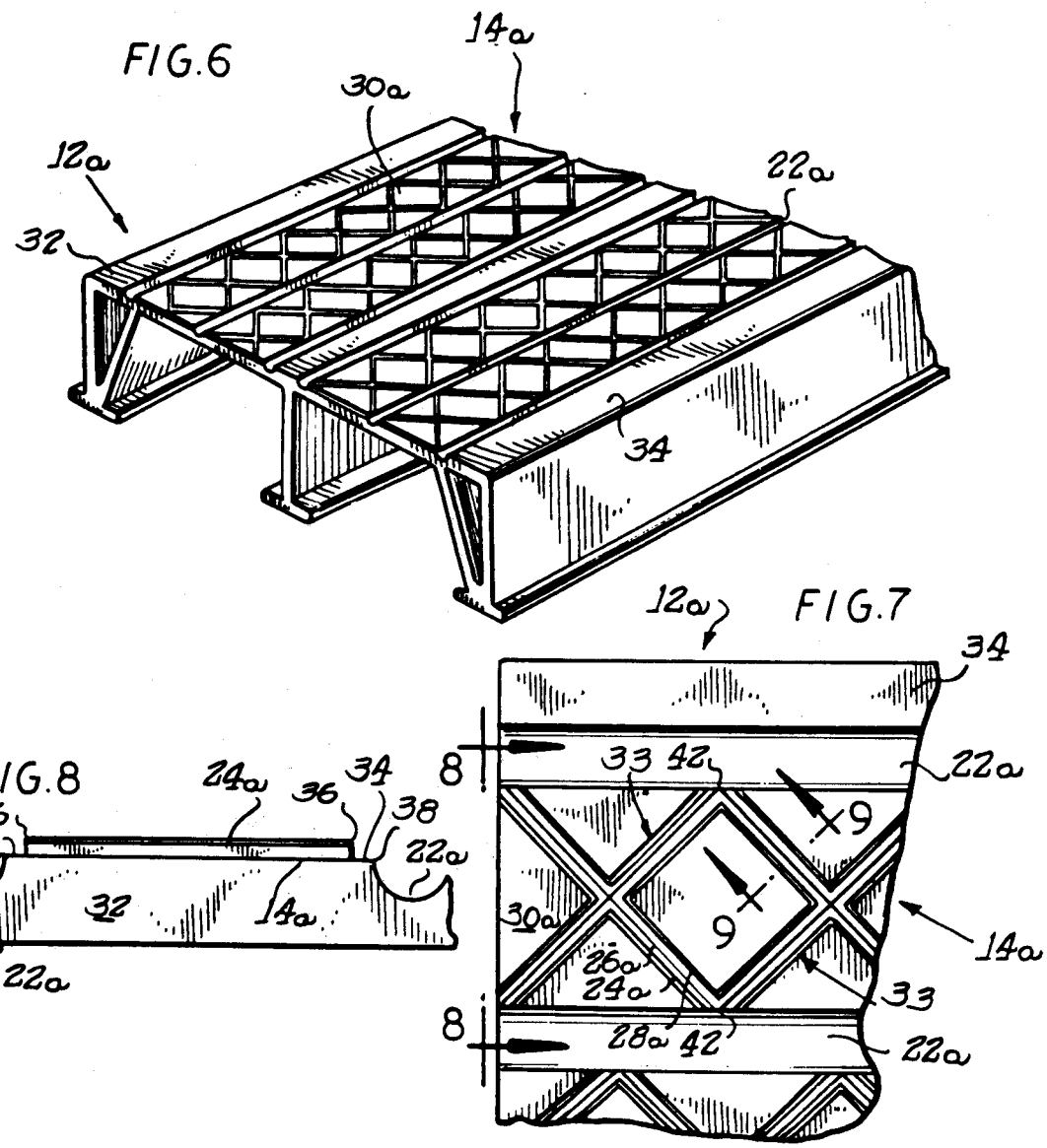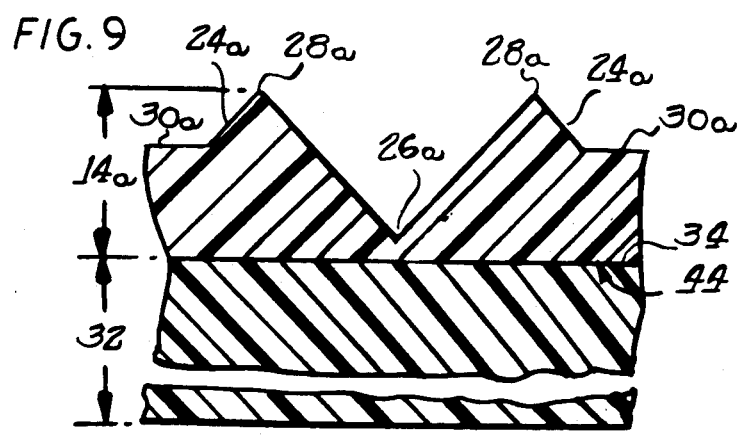

5,009,045

PLANK STRUCTURE FOR BOAT DOCK AND THE LIKE

BACKGROUND OF THE INVENTION

This invention relates generally to dock accessory arts and more particularly to extruded plank structures for docks and the like.

Boating is considered by many to be the number one outdoor recreational activity in the United States today. More people than ever are enjoying recreational boating activities ranging from canoeing to yachting. The increase in the number of boats on America's waterways has likewise increased the need for the number of slips, piers and docks at which to moor these watercraft.

Docks are generally constructed in either a fixed dock or a floating dock arrangement. A fixed dock is comprised of pilings or piers which are driven into the floor of a body of water; stringers are secured to these pilings and planks are appropriately attached to the stringers. The floating dock is essentially comprised of a deck surface which floats on buoyancy material secured underneath the deck surface. In the floating dock configuration, a series of floating deck sections are often attached to one another to create a larger or longer floating surface.

Typically, docks are constructed with a decking surface of wood or metal planking fastened to an underlying structural frame. While wood and metal planking is commonly used as decking materials, mainly because of a lack of alternatives, there are many problems associated with these materials. Wood planking tends to warp, splinter and rot; problems which are inherent in wood and accelerated in a harsh marine environment. Likewise, extruded metal planking, most commonly aluminum, tends to corrode in a humid marine environment and becomes extremely hot when in the sun. From the above problems it is clear that both materials have generally poor weatherability characteristics.

Attempts at overcoming the above problems produced weather resistant plastic planking. Prior art plastic planks had another problems in that plastic has a low coefficient of friction and therefore the planks were very slippery. Treads and water draining grooves formed into the surface of the plank to reduce the slippery characteristics of the plank were not successful since the plank material itself had a low coefficient of friction.

Finally, non-slip materials were attached to the plank but the adhesive non-slip materials tended to peel off over time and those which were mechanically fastened to the planks required additional parts and labor and generally had exposed fasteners.

OBJECTS AND SUMMARY OF THE INVENTION

A general object of the present invention is to provide a plastic plank member for use with a deck arrangement which has a sufficient coefficient of friction to reduce the possibility of slipping on the plank member.

Another object of the present invention is to provide a plastic plank member which is weather resistant, durable, aesthetically pleasing and integrally formed of plastic.

A more specific object of the present invention is to provide a plastic plank member which has an integrally formed tread to provide increased traction on the plank.

Yet another object of the present invention is to provide a plastic plank member in which the tread is generally elastically deformable and is integrally formed with upwardly extruded protrusions projecting upwardly away from the surface of the tread and grooves projecting downward toward a top portion of the plank member to which the tread is attached.

Briefly, and in accordance with the foregoing, the present invention comprises a plastic plank member, for use with a deck arrangement, having a rigid base portion and a tread portion attached thereto which are integrally extruded of suitable plastics. The rigid portion of the plank member is adapted to be secured to an underlying support structure. The tread portion is formed with protrusions projecting upwardly away from the tread and grooves formed therein. The characteristics of the tread result in a sufficiently high coefficient of friction to reduce the possibility of slipping on the plank member.

BRIEF DESCRIPTION OF THE DRAWINGS

The features of the present invention which are believed to be novel are set forth with particularity in the appended claims. The organization and manner of the operation of the invention, together with the further objects and advantages thereof, may best be understood by reference to the following description taken in connection with the accompanying drawings in which like reference numerals identify like elements and in which:

FIG. 1 is a partial perspective view of a plastic plank member with a tread portion integrally formed on a top surface thereof;

FIG. 2 is an end view of the plastic plank member shown in FIG. 1 illustrating a tread portion integrally formed in the top surface of the plank member;

FIG. 3 is an enlarged partial top view of the plank member illustrated in FIG. 1;

FIG. 4 is an enlarged view of the tread area in detail 4 as illustrated in FIG. 3;

FIG. 5 is a cross-sectional view taken along line 5—5 in FIG. 4 showing upwardly extruded projecting protrusions and a downwardly extruded recess formed in the tread portion;

FIG. 6 is a partial perspective view of a plank member having high friction material tread portions integrally formed on the top surface of the plank;

FIG. 7 is an enlarged partial top view of a tread portion of the plank member illustrated in FIG. 6;

FIG. 8 is an enlarged partial end view taken along line 8—8 in FIG. 7 showing the tread integrally formed on top of the rigid base portion; and FIG. 9 is an enlarged partial fragmentary cross-sectional view taken along line 9—9 as illustrated in FIG. 8 showing the embossed pattern in the tread and the tread integrally extruded on top of the rigid base portion of the plank member.

DETAILED DESCRIPTION OF THE ILLUSTRATED EMBODIMENT

While this invention is susceptible to embodiment in many different forms, there is shown in the drawings and will be herein described in detail, a specific embodiment with the understanding that the present disclosure is to be considered an exemplification of the principles of the invention, and is not intended to limit the invention to the embodiment illustrated.

It should be noted that dimensional relationships between members of the illustrated embodiment may vary in practice or may have been varied in the illustrations to emphasize certain features of the invention.

FIG. 1 is a partial perspective view of a plastic plank member 12 with tread means or tread portion 14 integrally formed on a top surface of the plank member. While the plank member 12 is extruded with flange supporting means 16 extending downwardly from an upper web 18 of the plank 12, it may be constructed of any configuration which is necessary to mount the plank 12 to form a dock structure. Generally the plank 12 is formed of a rigid plastic such as PVC (poly vinyl chloride). In particular the top surface 20 is of concern to the present invention such that the present invention increases the coefficient of friction of the top surface 20 thereby reducing the possibility of slipping on such surface.

The tread portion 14 illustrated in FIG. 1 has been "hot" embossed into the top surface 20 of the plank 12. The offset checked pattern tread 14 illustrated in FIG. 1 is the same as is shown in greater detail in the enlarged view of FIG. 3. As shown in the end view of the plank member 12 of FIG. 2, the ghost lines 21 paralleling the top surface 20 indicate that the tread portion is recessed below the upper portion of the top surface 20 and an upwardly extruded protrusion 24 rises above the top surface 20. Also shown are the perpendicular cross-sections of grooves 22 formed in the top surface which facilitate the draining of fluids which may accumulate on the top surface 20. Draining of the fluids increases the coefficient of friction by reducing the fluid layer between a passing body and the top surface 20.

FIG. 3 is an enlarged partial top view of the plank member 12 as illustrated in FIG. 1 and shows the check pattern of the tread portion 14 used in the present invention. The checked pattern tread 14 illustrated in FIG. 3 is shown in greater detail in FIGS. 4 and 5. While a check pattern has been illustrated and will be herein further described, a variety of patterns may be used for the tread portion 14. Also shown in FIG. 3 are the fluid draining grooves 22 which are formed parallel to a major axis 23 of the plank 12 and divide the tread forming the tread portion 14a has characteristics which permit it to be coextruded with the rigid base portion thereby bonding the tread portion 14a to the top 34 of the rigid base portion 32 along a boundary 44. Since the tread 14a is extruded with the base portion 32 adhesive and/or mechanical fasteners are not necessary to attach the tread 14a to the base portion 32.

The material used in forming the tread portion 14a is a TPE (thermal plastic elastomer) which is generally elastically deformable relative to the generally rigid material used in the base portion 32. A material named Alcryn, a melt-processable rubber (MPR) TPE elastomeric alloy with a co-efficient of friction greater that .5 made by DuPont Co., is used in the present embodiment for the tread portion 14a. One form of the present invention employs material for the tread means having a coefficient of friction of 0.65. A generally rigid, yet flexible, PVC (poly vinyl; chloride) plastic having a co-efficient of friction of approximately 0.4 using ASTM standard DZ047 is used for the base portion 32. Both of these materials possess high weatherability characteristics and are generally only nominally effected by moisture, sunlight, and temperature making them valuable materials for use in the present invention.

As described in detail above the present invention permits a plank 12, 12a to be formed of plastic material yet possessing characteristics which reduce the possibility of slipping on such a plastic plank 12, 12a. The first embodiment, illustrated in FIGS. 1 through 5 has a integrally formed tread portion 14 which increases the coefficient of friction to approximately greater than 0.5. In the second embodiment, FIGS. 6 through 9, the coefficient of friction is increased by forming a tread 14a extruded of a material which has a generally higher coefficient of friction and which is relatively portions 14 into separate areas or strips extending longitudinally of the plank. By dividing the tread portion 14 into separate areas the fluid can be more quickly and efficiently drained from between the tread patterns into the generally larger grooves 22. While the plastic material used to form the plank 12 generally has a coefficient of friction approximately less than 0.5, the tread portions 14 generally increases the coefficient of friction to greater than 0.5.

FIG. 4 provides an enlarged view of detail 4 as illustrated in FIG. 3 of the tread portion 14. FIG. 5 is a cross-sectional view taken along line 5—5 in FIG. 4 and shows embossments 25 formed in the tread 14 with upwardly extruded projecting portions 24 and a downwardly extruded recess 26 formed in the tread portion 14. As illustrated in FIG. 5, the upwardly extruded protrusions 24 are formed with a peak or ridge 28, of which two are illustrated in FIG. 5. These peaks 28 rise above the top surface 30 of the tread portion 14 thereby increasing the coefficient friction of the tread portion 14. Similarly, the recess 26 extruded downwardly into the tread helps to increase the coefficient of friction by reducing the surface fluid on the top surface 30 of the tread 14.

Turning now to an alternative embodiment, shown in FIGS. 6-9, wherein elements corresponding to those described above are designated by the same reference numerals with the suffix a added. The plank member 12a is structurally identical to the plank member 12 as illustrated in FIG. 1, however, tread means 14a is integrally extruded with a base portion 32 with each of these two parts being formed of different materials. The base portion 32 is integrally formed of a generally rigid plastic which has a coefficient of friction approximately less than 0.5. The tread portion 14a, attached to a top portion 34 of the base portion 32, is integrally extruded of a material having a coefficient of friction generally greater than 0.5 and attached to the top portion 34. A checked pattern is embossed in the tread portion 14a. The offset checked pattern of tread 14a illustrated in FIG. 6 is the same as is shown in greater detail in the enlarged view of FIG. 7.

The strips of tread means 14a, as illustrated in FIG. 8, are formed with a fluid draining groove 22a on either side of the tread 14a. Upwardly extruded protrusions 24, rising above the top-surface 30a of the tread 14a, tread edge 36 and a groove edge 38 provide additional structures which increase the coefficient of friction of the top surface of the plank member 12a. When formed as shown in FIG. 8, the tread means 14a are at an elevation greater than the fluid draining grooves 22a such that when fluid accumulates on the top surface 30a of the tread means 14a it tends to drain into the grooves 22a. As better shown in FIG. 7, the recesses 26a of the tread pattern drain into the grooves 22a at a point 42 and since the material used to form the tread means 14 is generally resilient, any fluid which builds up on top of the tread means 14a tends to be pushed from between the recess 26a into the grooves 22a when the tread 14a is resiliently compressed.

FIG. 9 is an enlarged partial fragmentary cross-sectional view taken along line 9—9 as illustrated in FIG. 8 and shows the upwardly extruded projecting protrusions or protrusions 24a having peaks 28a and the downwardly extruded recess 26a formed in the tread portion 14a. As shown in this side cross-sectional view, it is clear that the tread 14a is positioned on top of the rigid base portion 32. The material used in resilient relative to the base portion 32 to which it is attached. These combined factors provide a superior non-slip surface. The resiliency of the material helps to push water from between the tread pattern when a force is applied to the top thereof and generally deforms around a foot or other member applied thereto.

While a preferred embodiment of the present invention is shown and described, it is envisioned that those skilled in the art may devise various modifications of the present invention without departing from the spirit and scope of the appended claims.

The invention is claimed as follows:

1. A plastic plank member for a deck or the like integrally formed of a plastic material having a coefficient of friction less than approximately 0.5, said plank member comprising: a top portion formed of a first material and tread means formed of a second material integral with said top portion, said tread means having a coefficient of friction generally greater than 0.5, fluid drainage means for draining fluid from said tread means and from said top portion of said plank.

2. A plastic plank member for a deck or the like, said plank member integrally formed of a first plastic material and a second plastic material, said first and second plastic materials being co-extruded, said plank member comprising: a top portion formed of said first plastic material and tread means formed of said second plastic material integrally extruded with and attached to said top portion, said second material having a coefficient of friction greater than said first material and generally greater than 0.5, and fluid drainage means for draining fluid from said tread means and from said top portion of said plank.

3. A plastic plank member according to claim 2 wherein said tread means is formed of a plastic which is generally elastically deformable relative to said top portion to which said tread means is attached.

4. A plastic plank member according to claim 3 wherein said thermal plastic elastomer has a coefficient of friction of approximately 0.65 embossments thereon for draining fluids from the surface of said tread means for increasing the coefficient of friction of said tread means.

5. A plastic plank member according to claim 2 wherein said tread means comprise a plurality of strips separated by grooves formed therebetween in said top portion of said plank member.

6. A plastic plank member according to claim 5 wherein said embossments form protrusions projecting upwardly away from the top surface of said tread means for increasing the coefficient of friction of said tread means and draining fluids therefrom.

7. A plastic plank member according to claim 6 wherein said embossments form protrusions projecting upwardly from the top surface of said tread means and recesses formed therebetween below the surface of said tread means for enhancing fluid drainage therefrom.

8. A plastic plank member according to claim 1 wherein said tread means comprise a plurality of strips separated by grooves formed therebetween in said top portion of said plank member.

9. A plastic plank member according to claim 8 wherein said tread means is formed with embossments projecting upwardly away from a top surface of said tread means for increasing the coefficient of friction of said tread means and for draining fluids therefrom.

10. A plastic plank member according to claim 8 wherein said embossments form protrusions projecting upwardly from a top surface of said tread means and recesses formed therebetween below the top surface of said tread means.

11. A plastic plank member for a deck or the like, said plank member generally integrally formed of plastic having a coefficent of friction of generally less than 0.5, said plank member being integrally extruded with a relatively elastically deformable tread means having a coefficent of friction of generally greater than 0.5, and drainage means for draining fluid from said tread means and from said top portion of said plank.

12. A plastic plank member according to claim 11 wherein said tread means has a cross-sectional width being substantially less than that of a top portion of said plank member to which said tread means is attached.

13. A plastic plank member according to claim 11 wherein a rigid portion of said plank member is formed of a generally rigid PVC plastic.

* * * * *

UNITED STATES PATENT AND TRADEMARK OFFICE
CERTIFICATE OF CORRECTION

PATENT NO. : 5,009,045

DATED : April 23, 1991

INVENTOR(S) : Dennis G. Yoder

Page 1 of 3

It is certified that error appears in the above-identified patent and that said Letters Patent is hereby corrected as shown below:

Columns 3-6 should be deleted and the attached colums 3-6 should be inserted.

Signed and Sealed this

Fourth Day of May, 1993

Attest:

MICHAEL K. KIRK

Attesting Officer

Acting Commissioner of Patents and Trademarks of the invention, and is not intended to limit the invention to the embodiment illustrated.

It should be noted that dimensional relationships between members of the illustrated embodiment may vary in practice or may have been varied in the illustrations to emphasize certain features of the invention.

FIG. 1 is a partial perspective view of a plastic plank member 12 with tread means or tread portion 14 integrally formed on a top surface of the plank member. While the plank member 12 is extruded with flange supporting means 16 extending downwardly from an upper web 18 of the plank 12, it may be constructed of any configuration which is necessary to mount the plank 12 to form a dock structure. Generally the plank 12 is formed of a rigid plastic such as PVC (poly vinyl chloride). In particular the top surface 20 is of concern to the present invention such that the present invention increases the coefficient of friction of the top surface 20 thereby reducing the possibility of slipping on such surface.

The tread portion 14 illustrated in FIG. 1 has been "hot" embossed into the top surface 20 of the plank 12. The offset checked pattern tread 14 illustrated in FIG. 1 is the same as is shown in greater detail in the enlarged view of FIG. 3. As shown in the end view of the plank member 12 of FIG. 2, the ghost lines 21 paralleling the top surface 20 indicate that the tread portion is recessed below the upper portion of the top surface 20 and an upwardly extruded protrusion 24 rises above the top surface 20. Also shown are the perpendicular cross-sections of grooves 22 formed in the top surface which facilitate the draining of fluids which may accumulate on the top surface 20. Draining of the fluids increases the coefficient of friction by reducing the fluid layer between a passing body and the top surface 20.

FIG. 3 is an enlarged partial top view of the plank member 12 as illustrated in FIG. 1 and shows the check pattern of the tread portion 14 used in the present invention. The checked pattern tread 14 illustrated in FIG. 3 is shown in greater detail in FIGS. 4 and 5. While a check pattern has been illustrated and will be herein further described, a variety of patterns may be used for the tread portion 14. Also shown in FIG. 3 are the fluid draining grooves 22 which are formed parallel to a major axis 23 of the plank 12 and divide the tread portions 14 into separate areas or strips extending longitudinally of the plank. By dividing the tread portion 14 into separate areas the fluid can be more quickly and efficiently drained from between the tread patterns into the generally larger grooves 22. While the plastic material used to form the plank 12 generally has a coefficient of friction approximately less than 0.5, the tread portions 14 generally increases the coefficient of friction to greater than 0.5.

FIG. 4 provides an enlarged view of detail 4 as illustrated in FIG. 3 of the tread portion 14. FIG. 5 is a cross-sectional view taken along line 5—5 in FIG. 4 and shows embossments 25 formed in the tread 14 with upwardly extruded projecting portions 24 and a downwardly extruded recess 26 fromed in the tread portion 14. As illustrated in FIG. 5, the upwardly extruded protrusions 24 are formed with a peak or ridge 28, of which two are illustrated in FIG. 5. These peaks 28 rise above the top surface 30 of the tread portion 14 thereby increasing the coefficient friction of the tread portion 14. Similarly, the recess 26 extruded downwardly into the tread helps to increase the coefficient of friction by reducing the surface fluid on the top surface of the tread 14.

Turning now to an alternative embodiment, shown in FIGS. 6–9, wherein elements corresponding to those described above are designated by the same reference numerals with the suffix a added. The plank member 12a is structurally identical to the plank member 12 as illustrated in FIG. 1, however, tread means 14a is integrally extruded with a base portion 32 with each of these two parts being formed of different materials. The base portion 32 is integrally formed of a generally rigid plastic which has a coefficient of friction approximately less than 0.5. The tread portion 14a, attached to a top portion 34 of the base portion 32, is integrally extruded of a material having a coefficient of friction generally greater than 0.5 and attached to the top portion 34. A checked pattern is embossed in the tread portion 14a. The offset checked pattern of tread 14a illustrated in FIG. 6 is the same as is shown in greater detail in the enlarged view of FIG. 7.

The strips of tread means 14a, as illustrated in FIG. 8, are formed with a fluid draining groove 22a on either side of the tread 14a. Upwardly extruded protrusions 24, rising above the top surface 30a of the tread 14a, tread edge 36 and a groove edge 38 provide additional structures which increase the coefficient of friction of the top surface of the plank member 12a. When formed as shown in FIG. 8, the tread means 14a are at an elevation greater than the fluid draining grooves 22a such that when fluid accumulates on the top surface 30a of the tread means 14a it tends to drain into the grooves 22a. As better shown in FIG. 7, the recesses 26a of the tread pattern drain into the grooves 22a at a point 42 and since the material used to form the tread means 14 is generally resilient, any fluid which builds up on top of the tread means 14a tends to be pushed from between the recess 26a into the grooves 22a when the tread 14a is resiliently compressed.

FIG. 9 is an enlarged partial fragmentary cross-sectional view taken along line 9—9 as illustrated in FIG. 8 and shows the upwardly extruded projecting protrusions or protrusions 24a having peaks 28a and the downwardly extruded recess 26a formed in the tread portion 14a. As shown in this side cross-sectional view, it is clear that the tread 14a is positioned on top of the rigid base portion 32. The material used in forming the tread portion 14a has characteristics which permit it to be coextruded with the rigid base portion thereby bonding the tread portion 14a to the top 34 of the rigid base portion 32 along a boundary 44. Since the tread 14a is extruded with the base portion 32 adhesive and/or mechanical fasteners are not necessary to attach the tread 14a to the base portion 32.

The material used in forming the tread portion 14a is a TPE (thermal plastic elastomer) which is generally elastically deformable relative to the generally rigid material used in the base portion 32. A material named Alcryn, a melt-processable rubber (MPR) TPE elastomeric alloy with a co-efficient of friction greater than 0.5 made by DuPont Co., is used in the present embodiment for the tread portion 14a. One form of the present invention employs material for the tread means having a coefficient of friction of 0.65. A generally rigid, yet flexible, PVC (poly vinyl chloride) plastic having a co-efficient of friction of approximately 0.4 using ASTM standard DZ047 is used for the base portion 32. Both of these materials possess high weatherability characteristics and are generally only nominally effected by moisture, sunlight and temperature making them valuable materials for use in the present invention.

As described in detail above the present invention permits a plank 12, 12a to be formed of plastic material yet possessing characteristics which reduce the possibility of slipping on such a plastic plank 12, 12a. The first embodiment, illustrated in FIGS. 1 through 5 has a integrally formed tread portion 14 which increases the coefficient of friction to approximately greater than 0.5. In the second embodiment, FIGS. 6 through 9, the coefficient of friction is increased by forming a tread 14a extruded of a material which has a generally higher coefficient of friction and which is relatively resilient relative to the base portion 32 to which it is attached. These combined factors provide a superior non-slip surface. The resiliency of the material helps to push water from between the tread pattern when a force is applied to the top thereof and generally deforms around a foot or other member applied thereto.

While a preferred embodiment of the present invention is shown and described, it is envisioned that those skilled in the art may devise various modifications of the present invention without departing from the spirit and scope of the appended claims.

The invention is claimed as follows:

1. A plastic plank member for a deck or the like integrally formed of a plastic material having a coefficient of friction less than approximately 0.5, said plank member comprising: a top portion formed of a first material and tread means formed of a second material integral with said top portion, said tread means having a coefficient of friction generally greater than 0.5, fluid drainage means for draining fluid from said tread means and from said top portion of said plank.

2. A plastic plank member for a deck or the like, said plank member integrally formed of a first plastic material and a second plastic material, said first and second plastic materials being co-extruded, said plank member comprising: a top portion formed of said first plastic material and tread means formed of said second plastic material integrally extruded with and attached to said top portion, said second material having a coefficient of friction greater than said first material and generally greater than 0.5, and fluid drainage means for draining fluid from said tread means and from said top portion of said plank.

3. A plastic plank member according to claim 2 wherein said tread means is formed of a plastic which is generally elastically deformable relative to said top portion to which said tread means is attached.

4. A plastic plank member according to claim 3 wherein said thermal plastic elastomer has a coefficient of friction of approximately 0.65.

5. A plastic plank member according to claim 2 wherein said tread means comprise a plurality of strips separated by grooves formed therebetween in said top portion of said plank member.

6. A plastic plank member according to claim 5 wherein said embossments form protrusions projecting upwardly away from the top surface of said tread means for increasing the coefficient of friction of said tread means and draining fluids therefrom.

7. A plastic plank member according to claim 5 wherein said embossments form protrusions projecting upwardly from the top surface of said tread means and recesses formed therebetween below the surface of said tread means for enhancing fluid drainage therefrom.

8. A plastic plank member according to claim 1 wherein said tread means comprise a plurality of strips separated by grooves formed therebetween in said top portion of said plank member.

9. A plastic plank member according to claim 8 wherein said tread means is formed with embossments projecting upwardly away from a top surface of said tread means for increasing the coefficient of friction of said tread means and for draining fluids therefrom.

10. A plastic plank member according to claim 8 wherein said embossments form protrusions projecting upwardly from a top surface of said tread means and recesses formed therebetween below the top surface of said tread means.

11. A plastic plank member for a deck or the like, said plank member generally integrally formed of plastic having a coefficent of friction of generally less than 0.5, said plank member being integrally extruded with a relatively elastically deformable tread means having a coefficent of friction of generally greater than 0.5, and drainage means for draining fluid from said tread means and from said top portion of said plank.

12. A plastic plank member according to claim 11 wherein said tread means has a cross-sectional width being substantially less than that of a top portion of said plank member to which said tread means is attached.

13. A plastic plank member according to claim 11 wherein a rigid portion of said plank member is formed of a generally rigid PVC plastic.

* * * * *